United States Patent
Gillespie et al.

(10) Patent No.: US 9,951,223 B2
(45) Date of Patent: Apr. 24, 2018

(54) ASPHALT-BASED PATCH COMPOSITION AND METHOD

(71) Applicant: Saguaro, Corp., Wichita, KS (US)

(72) Inventors: Sean T. Gillespie, Scottsdale, AZ (US); Gilberto Garcia, Jr., El Paso, TX (US); Leslie Griffith, Wichita, KS (US)

(73) Assignee: BTAP, LLC, Phoenix, AZ (US)

( * ) Notice: Subject to any disclaimer, the term of this patent is extended or adjusted under 35 U.S.C. 154(b) by 532 days.

(21) Appl. No.: 14/555,386

(22) Filed: Nov. 26, 2014

(65) Prior Publication Data
US 2016/0145434 A1    May 26, 2016

(51) Int. Cl.
*C08L 95/00*    (2006.01)
*C08K 5/00*    (2006.01)

(52) U.S. Cl.
CPC ............ *C08L 95/00* (2013.01); *C08K 5/0008* (2013.01); *C08L 2555/34* (2013.01); *C08L 2555/74* (2013.01)

(58) Field of Classification Search
CPC .. C08L 95/00; C08L 2555/34; C08L 2555/74; C08K 5/00; C08K 5/0008
See application file for complete search history.

(56) References Cited

U.S. PATENT DOCUMENTS

| | | | | |
|---|---|---|---|---|
| 4,744,693 A * | 5/1988 | Smith | ................ | E01C 11/005 404/77 |
| 5,217,530 A * | 6/1993 | Grzybowski | ........... | C08L 95/00 106/163.01 |
| 5,221,338 A * | 6/1993 | Gaudio | ................ | C08L 95/00 106/278 |
| 5,223,032 A * | 6/1993 | Gaudio | ................ | C08L 95/00 106/278 |
| 5,236,497 A * | 8/1993 | Grzybowski | ........... | C08L 95/00 106/271 |
| 5,340,391 A * | 8/1994 | Grzybowski | ........... | C08L 95/00 106/277 |
| 5,378,079 A * | 1/1995 | Omann | ................ | E01C 7/182 404/101 |
| 5,385,426 A * | 1/1995 | Omann | ................ | E01C 7/182 404/75 |
| 5,511,899 A * | 4/1996 | Pavelek, II | ............. | E01C 7/145 404/31 |
| 6,186,700 B1 * | 2/2001 | Omann | ................ | C04B 26/26 404/79 |

(Continued)

OTHER PUBLICATIONS

Tear Off Scrap Asphalt Shingles (TOSS) Minnesota Department of Transportation Feb. 22, 2010. http://www.dot.state.mn.us/materials/bituminousdocs/Specifications/2010/Shingle_TOSS_2010_02-22-2010.pdf.*

Primary Examiner — Jennifer A Smith
Assistant Examiner — Alexandra M Moore
(74) Attorney, Agent, or Firm — Snell & Wilmer L.L.P.

(57) ABSTRACT

An asphalt cold-patch compound composition and method are disclosed. The compound can include bituminous material and an oil binder mixed according to a ratio. For example, recycled roofing shingles and used motor oil can be mixed according to a ratio of about 9:1 to about 20:1. The compound is suitable for patching surfaces, such as roads, and can be placed in service without heating. The asphalt cold-patch compound can be made from recycled materials and can be applied without specialized heating equipment.

8 Claims, 10 Drawing Sheets

(56) References Cited

U.S. PATENT DOCUMENTS 6,290,152 B1 * 9/2001 Zickell .................. B02C 17/04
  241/21
6,497,930 B1 * 12/2002 Petermeier .......... B29B 17/0042
  264/120

* cited by examiner

SECTION A-A

DETAIL B-B

DETAIL C-C

ASPHALT-BASED PATCH COMPOSITION AND METHOD

FIELD OF THE INVENTION

The present disclosure generally relates to asphalt patch compositions and to methods of forming and using the compositions. More particularly, the present disclosure relates to compositions suitable for asphalt cold-patch applications and to methods of forming and using the compositions.

BACKGROUND OF THE INVENTION

Roads often develop cracks from road traffic, weather, and other causes. The cracks that develop are often repaired by depositing a patching compound on the road and applying heat to cause the patching compound to flow and fill the cracks. Although these techniques work well in some applications, the compounds are difficult to apply, and using such methods often results in the interruption of traffic while the heat is applied and during the subsequent cooling of the asphalt patch. Furthermore, a sprayer or other specialized equipment is often used to apply the compound.

Traditional patching compounds are typically made up of fresh resources, such as virgin aggregate, rather than incorporating only recycled ingredients. Moreover, traditional patching compounds are made up of several different ingredients, the combination of which adds expense and time to the manufacturing process.

In addition, traditional patching compounds often fail to repel water and/or do not remain pliable when in service. As such, traditional patching compounds often fail as heating and cooling of the road surface occurs and/or as exposure to water causes the patching compound itself to crack. Accordingly, improved compositions and methods for repairing defects in roads and other surfaces are desired.

SUMMARY OF THE INVENTION

Various embodiments of the present disclosure relate to compounds suitable for cold-patch applications and to methods of forming and using the compositions. The compounds and methods discussed herein can be used for a variety of applications, including repair of roads (e.g., asphalt) and other surfaces.

Exemplary compositions and methods described herein use materials primarily or exclusively comprising recycled materials. Additionally, or alternatively, the compositions and methods are relatively inexpensive, relatively easy to transport and/or can be applied quickly, with little interruption to traffic.

In accordance with various embodiments of the disclosure, a method of making an asphalt cold-patch compound is provided. Exemplary methods include providing material comprising bituminous material and mixing the bituminous material with an oil (e.g., an oil) binder to form an asphalt cold-patch compound. The method optionally includes segregating the bituminous material from other material. In accordance with exemplary aspects, the method includes grinding the bituminous material to form ground particulate bituminous material, optionally screening the ground bituminous material through one or more screens, and mixing the ground particulate bituminous material with the oil binder to form a mixture comprising oil-coated ground particulate bituminous material.

The oil binder may be filtered. In some embodiments, the oil binder is petroleum based, such as new or used motor oil, or burning fuel, and in other embodiments, the oil binder comprises, for example, cooking oil. By way of example, the oil binder can be a petroleum binder, such as used motor oil; e.g., a non-synthetic used motor oil. The used motor oil can be obtained from, for example, discarded diesel truck motor oil. Use of used motor oil, having a viscosity otherwise lower than the corresponding new motor oil, may be advantageous because it penetrates and/or is absorbed by the particles better than the new oil.

As noted above, exemplary methods can include a step of screening the ground particulate bituminous material. Exemplary processes include passing 100% of the material through a ½" screen (12.7 mm). The screening may additionally or alternatively include passing about 87% to 100% of the ground particulate bituminous material through, for example a number ⅜" screen mesh (9.525 mm). Additionally or alternatively, the method can include passing about 85% to about 100% of the ground particulate bituminous material through, for example, a number 4 mesh screen (0.187" or 4.75 mm). Additionally or alternatively, the method can include passing about 80% to about 100% of the ground particulate bituminous material through, for example, a number 8 mesh screen (0.0937" or 2.38 mm).

According to additional exemplary embodiments of the disclosure, a compound suitable for cold-patch applications includes a bituminous material ground into ground particulate bituminous material and an oil binder. The mixture can form a unitary pliable material in response to an applied pressure of, for example, about 50 PSI (about 345 kPa) to about 150 PSI (about 1034 kPa) or more. In accordance with various aspects of these embodiments, the ground particulate bituminous material and the oil binder are combined according to a ratio of about 9 to about 20 parts, about 10 to about 19 parts, about 12 to about 18 parts, about 13 to about 17 parts, about 14 to about 16 parts, or about 15 ground particulate bituminous material to about 1 part oil binder.

The bituminous material may be obtained from recycled asphalt roofing shingles. The ground particulate bituminous material may be made from, for example, pieces of asphalt roofing shingles that have been separated from other waste material, such as plastics and backing material.

The ground particulate bituminous material and the oil binder may be mixed prior to transportation and/or application. For instance, the ground particulate bituminous material and the oil binder may be mechanically mixed for a duration of about two minutes to about six minutes. The mixture can be formed at a central location and stored until transporting to an application site. This allows easy storage and quick application of the material at a repair site.

The mixture of ground particulate bituminous material and oil binder may be packaged. The mixture may be packaged, for example, in a (e.g., sealable) bucket or in a plastic sack.

These and other features and advantages of the present invention will become apparent to a person having ordinary skill in the art from the following description and accompanying drawings.

BRIEF DESCRIPTION OF THE DRAWINGS

A more complete understanding of the present invention may be derived by referring to the detailed description and claims when considered in connection with the figures, where like reference numbers refer to similar elements throughout the figures, and:

It will be appreciated that elements in the figures are illustrated for simplicity and clarity and have not necessarily been drawn to scale. For example, the dimensions of some of the elements in the figures may be exaggerated relative to other elements to help to improve the understanding of illustrated embodiments of the present disclosure.

DETAILED DESCRIPTION

The following description is of various exemplary embodiments only, and is not intended to limit the scope, applicability or configuration of the present disclosure in any way. Rather, the following description is intended to provide a convenient illustration for implementing various exemplary embodiments. As will become apparent, various changes may be made in the function and/or arrangement of elements and/or method steps in connection with exemplary embodiments, without departing from the scope of the appended claims.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

Composition

Figure 1:
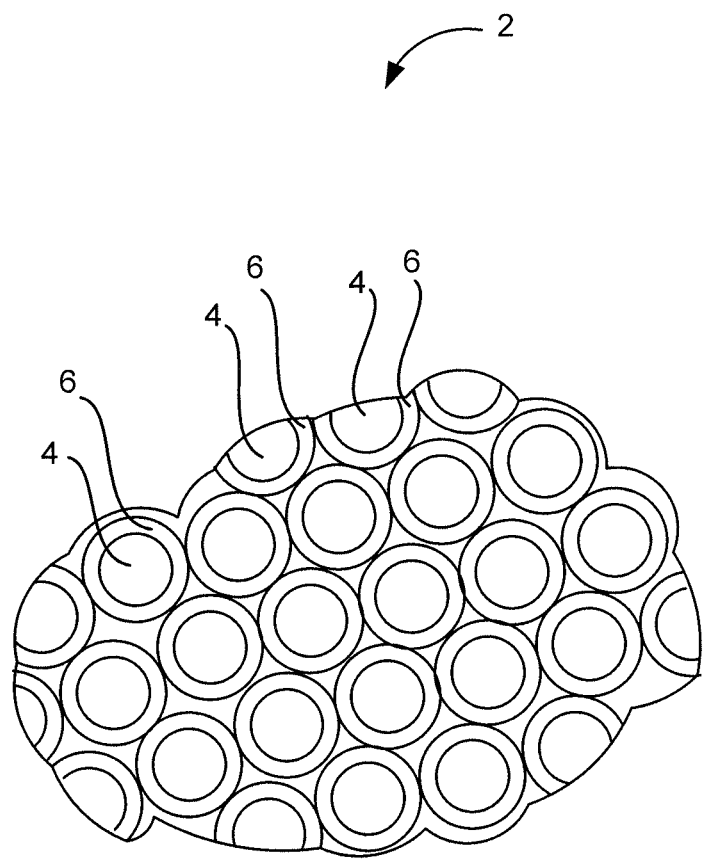
FIG. 1 is an illustration of an asphalt cold-patch compound, in accordance with various embodiments.

In accordance with various exemplary embodiments of the disclosure, a compound suitable for cold-patch applications includes bituminous material and an oil binder. With reference to FIG. 1, the exemplary asphalt cold-patch compound 2 includes a loose material composition—e.g., having a consistency of wet sand. For example, asphalt cold-patch compound 2 may comprise pieces of bituminous material, such as ground particulate bituminous material 4 ("GPBM"), covered with oil binder 6. The asphalt cold-patch compound 2 may be pre-mixed and stored. The mixture can be transported to a site for repair and can be shoveled or otherwise deposited onto or into a defect in a surface. Exemplary surfaces include a road or other surface. For example, asphalt cold-patch compound 2 may be suitable for patching asphalt surfaces, concrete surfaces, brick surfaces, and other surfaces. Asphalt cold-patch compound 2 may be ready for service after depositing and without the need for the application of external heat, or melting. In further embodiments, asphalt cold-patch compound 2 may be exposed to an applied pressure prior to the surface being ready for service.

Asphalt cold-patch compound 2 may comprise recycled materials. In various embodiments, ground particulate bituminous material 4 includes recycled asphalt roofing shingles. The recycled asphalt roofing shingles may include a single type of shingle or a combination of types of shingles. In still further embodiments, ground particulate bituminous material 4 includes any asphalt, for example, recycled paving material or the like.

By way of examples, ground particulate bituminous material 4 includes recycled asphalt roofing shingles that have been segregated from other waste in a waste stream. For example, the recycled asphalt roofing shingles may be segregated from waste roofing nails, such as by magnets. Ground particulate bituminous material 4 may include bituminous material from recycled asphalt roofing shingles that have also been segregated from undesired parts of the recycled asphalt roofing shingles, such as fiberglass, felt and/or plastic components; for example, films and/or shingle backer material can be removed from the roofing shingles. Thus, ground particulate bituminous material 4 may be made of bituminous material segregated from a variety of other waste products, both comprising undesired components of the recycled asphalt roofing shingles themselves, and comprising other waste, through a variety of mechanisms. The product can include up to 1.5 percent undesired material, such as plastic, backing material, and the like. Ground particulate bituminous material 4 may be arranged in pellets, or otherwise into pieces. For example, bituminous material may be ground to form ground particulate bituminous material 4 as illustrated in FIG. 1. Ground bituminous material 4 may comprise pieces having a cross-sectional dimension up to a 0.25 inch, 0.375 inch (about 9.53 mm) or 0.5 inch; that is 100% of the pieces pass through a screen having such dimensions. Additionally or alternatively, ground particulate bituminous material 4 may comprise pieces having a variety of sizes comprising about 87% to about 100%, or about 90% to about 100%, or about 97% passing through a ⅜" (9.525 mm) screen. Additionally or alternatively, about 85% to about 100%, or about 90% to about 100%, or about 95% of the pieces can pass through a 0.187 (4.75 mm) mesh (e.g., a #4 defined by the American Society for Testing and Materials E11 standard). Yet additionally or alternatively, about 80% to about 100%, or about 85% to about 100%, or about 90% can pass through a 0.937 (2.38 mm) mesh (e.g., a #8 defined by the American Society for Testing and Materials E11 standard). For example, bituminous material may be ground to form ground particulate bituminous material 4 having up to about 0.25 inch (about 6.35 mm), about 0.375 inch (about 9.53 mm), or about 0.5 inch (about 12.7 mm) cross-sectional dimension. Subsequently, ground particulate bituminous material 4 may be further segregated by passing the material through one or more meshes or screens. For instance, ground particulate bituminous material 4 may be passed through a mesh so that ground particulate bituminous material 4 breaks into smaller pieces and/or the smaller pieces are segregated from the larger pieces. The mesh/screen sizes may be those noted above, namely ½", ⅜", no. 4 mesh, and no. 8 mesh, with the percent of material passing through each mesh as noted above.

In further embodiments, ground particulate bituminous material 4 comprises pieces having a variety of dimensions, but comprising about 50% to about 100%, about 75% to about 95%, or about 95% passing through a #4 mesh. As such, ground particulate bituminous material 4 may comprise about 50% to about 100%, about 75% to about 95%, or about 95% of pieces having a cross-sectional dimension no greater than about 0.187 inches (about 4.75 mm).

In yet further embodiments, ground particulate bituminous material 4 comprises pieces having a variety of cross-sectional dimensions (e.g., the largest cross-sectional dimensions), but comprising at least 40%, 50%, 60%, or 80%, no larger than about 0.25 inch (about 6.35 mm), 0.5 inch, 0.625 inch (about 15.9 mm) or 0.75 inch (about 19.05 mm).

As noted above, oil binder 6 may comprise new or used motor oil, cooking oil, or the like. By way of examples, oil binder 6 comprises used motor oil. The used motor oil may comprise used diesel truck motor oil. Furthermore, different oil binders 6, and/or a combination of oil binders 6, may be used. For example, oil binder 6 may comprise one or more of new and/or used non-synthetic and/or synthetic motor oils. Furthermore, the oil binder may comprise impurities. For example, the used motor oil may comprise metal particles, such as metal particles resulting from wear associated with the operation of a motor. In various embodiments, certain impurities may be filtered, whereas in other embodiments, certain impurities may be desired. The used motor oil may have a viscosity, e.g., about 0.05 to about 350, or about 1 to about 100 Pa-s at 25 degrees Celsius.

Oil binder 6 may coat the ground particulate bituminous material 4. For example, asphalt cold-patch compound 2 may comprise pieces of ground particulate bituminous material 4 initially coated with oil binder 6. In further embodiments, oil binder 6 may penetrate into and be absorbed by the pieces of ground particulate bituminous material 4. As such, asphalt cold-patch compound 2 may remain a loose composition of pieces of material (e.g., having a consistency of wet sand), for example, during storage and transportation, and become a pliable material after pressure is applied to the compound.

To obtain desired bonding properties, in accordance with exemplary embodiments of the disclosure, ground particulate bituminous material 4 and oil binder 6 are combined according to a ratio. For example, the ratio may comprise any ratio whereby asphalt cold-patch compound 2 is a loose composition of different pieces of material during transportation and application, and yet may form into a single piece of material following application to surface being patched. For example, application of asphalt cold-patch compound 2 can include the exertion of an applied pressure on asphalt cold-patch compound 2, whereby oil binder 6 is impelled to flow into voids and retain compound 2 in position within the defect in a surface being patched. Thus, asphalt cold-patch compound 2 may become a unitary pliable material. In various embodiments, the compound comprises between 9 to about 20 parts, about 10 to about 19 parts, about 12 to about 18 parts, about 13 to about 17 parts, about 14 to about 16 parts, or about 15 parts ground particulate bituminous material to about 1 part oil binder 6.

Applying the Compound to a Surface

Figure 2:
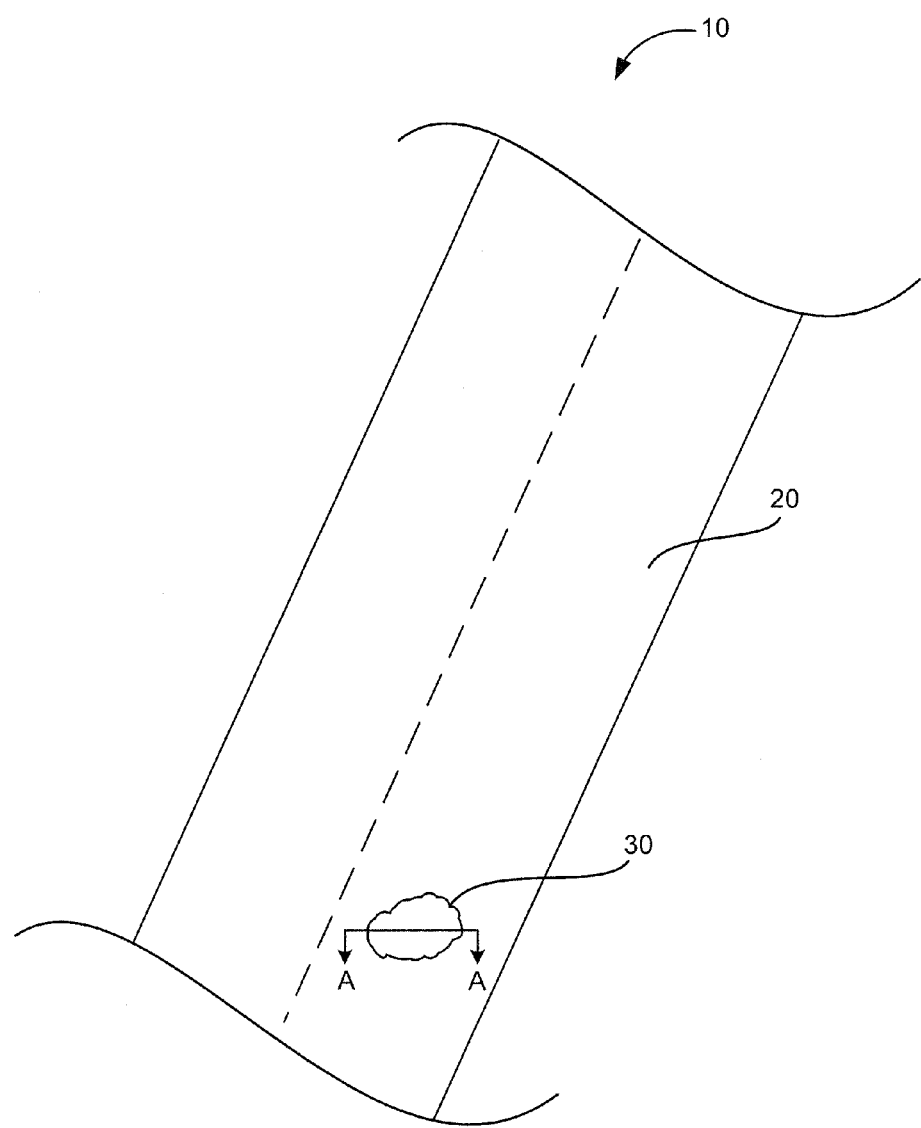
FIG. 2 is an illustration of a surface having a defect thereon.
Figure 6:
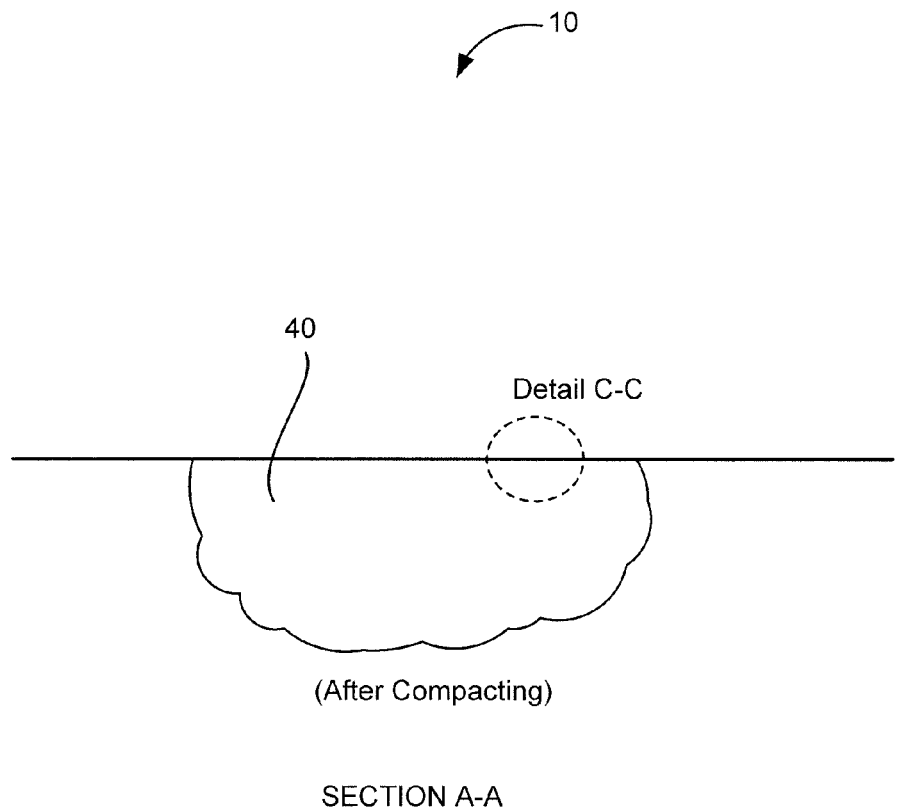
FIG. 6 is an illustration of a repaired defect, having been filled with an asphalt cold-patching compound and following compaction, in accordance with various embodiments.
Figure 7:
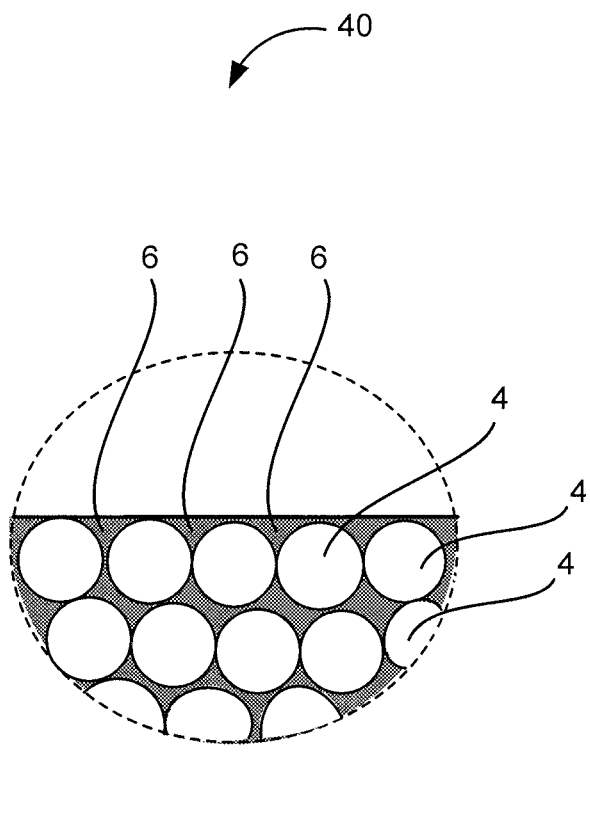
FIG. 7 is an illustration of the constituent ingredients of an asphalt cold-patching compound filled into a repaired defect and following to compaction, in accordance with various embodiments.
Figure 8:
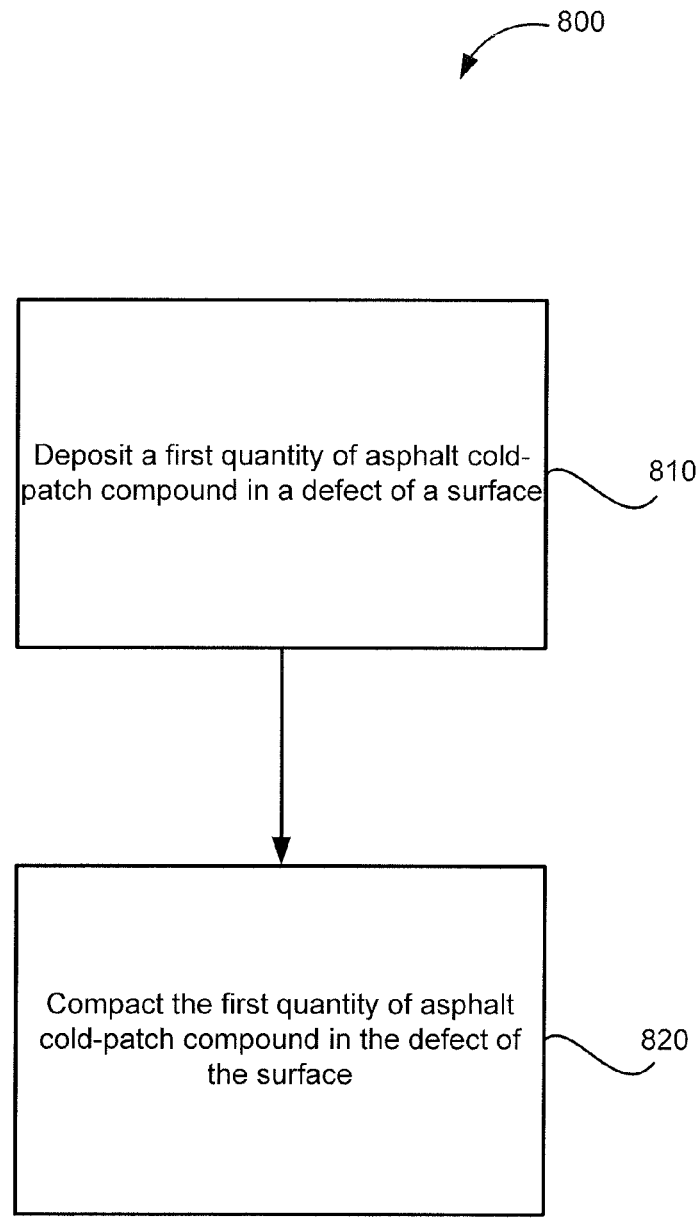
FIG. 8 is a flowchart illustrating an exemplary method of applying an asphalt cold-patch compound according to various embodiments.

Having discussed various features of an asphalt cold-patch compound 2, attention is directed to FIGS. 1-7 and with initial reference to FIG. 8, which illustrates an exemplary method 800 of applying an asphalt cold-patch compound 2 to a surface 20 illustrated in FIG. 2. Surface 20 may be an asphalt surface or other suitable surface that includes a defect 30 formed thereon. Defect 30 may comprise a void in the surface 20, such as a cavity or crack.

Figure 3:
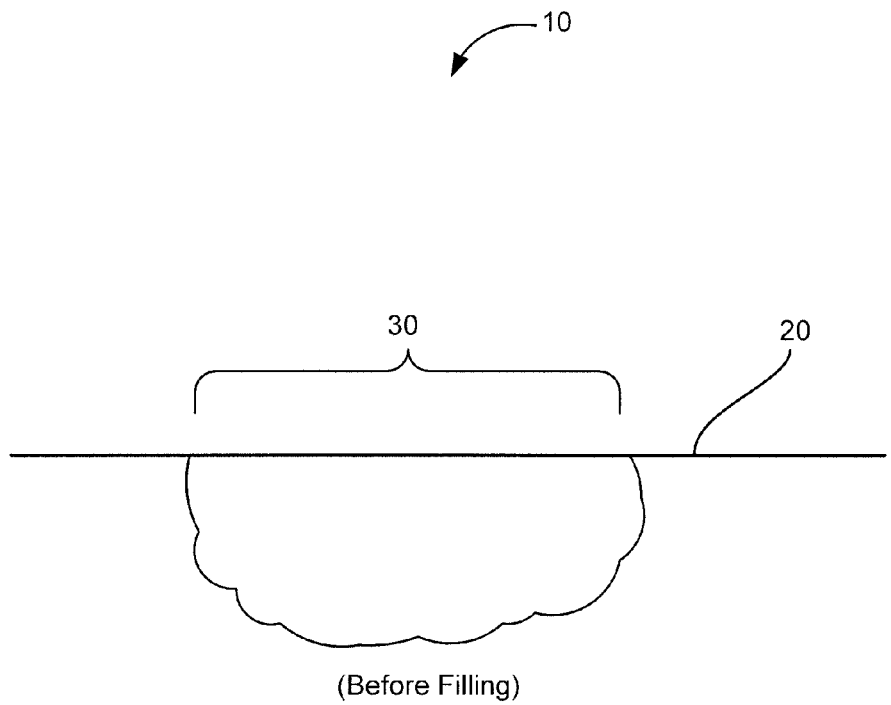
FIG. 3 is an enlarged illustration of the defect illustrated in FIG. 2.

Broadly, a quantity 40, illustrated in FIG. 3, of asphalt cold-patch compound 2 may be deposited into a defect 30 of a surface 20 (Step 810). Quantity 40 of asphalt cold-patch compound 2 may be compacted in the defect 30 of the surface 20 (Step 820).

Figure 4:
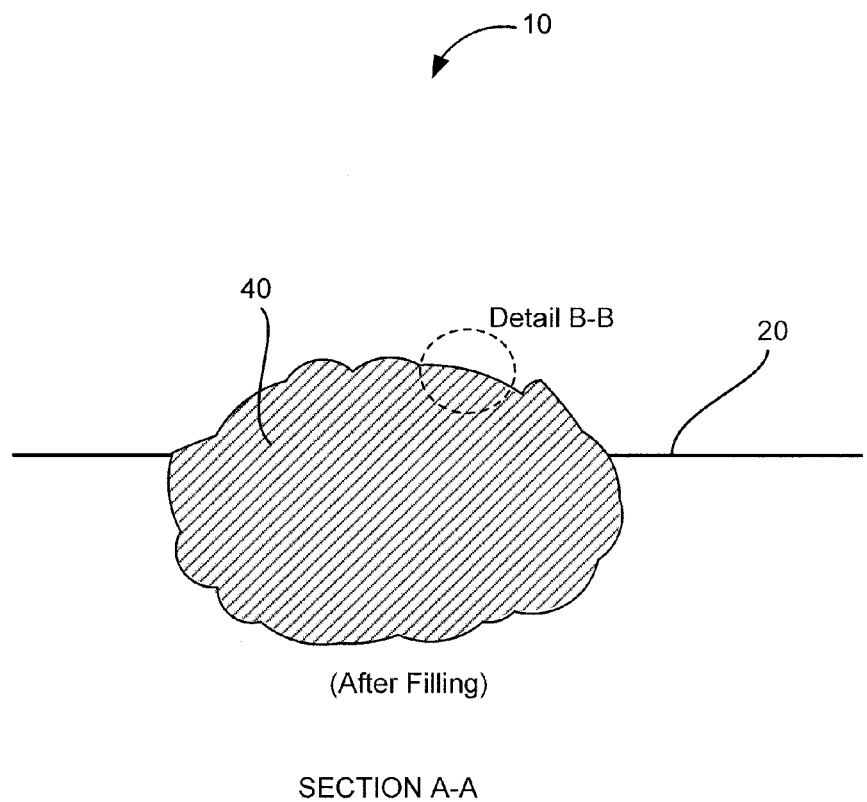
FIG. 4 is an illustration of a repair in process, wherein a defect has been filled with an asphalt cold-patching compound and prior to compaction, in accordance with various embodiments.
Figure 5:
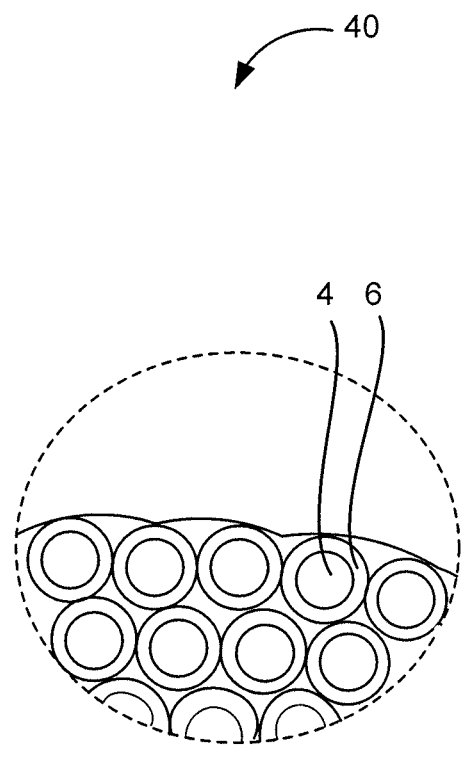
FIG. 5 is an illustration of the constituent ingredients of an asphalt cold-patching compound filled into a repaired defect and prior to compaction, in accordance with various embodiments.

Addressing more specifically step 810 of depositing a quantity 40 of asphalt cold-patch compound 2 in the defect 30 of the surface 20, FIG. 4 illustrates that quantity 40 of asphalt cold-patch compound 2 may comprise a sufficient volume of asphalt cold-patch compound 2 to fill defect 30 and extend above the plane of surface 20. As shown in FIG. 5, asphalt cold-patch compound 2 may comprise ground particulate bituminous material 4 coated with an oil binder 6. There may further exist voids between pieces of ground particulate bituminous material 4 coated with oil binder 6. Thus, one may appreciate that asphalt cold-patch compound 2 may be applied in a loose composition, such as by shoveling.

Addressing more specifically step 820 of compacting the quantity 40 of asphalt cold-patch compound 2 in defect 30 of surface 20, FIG. 6 shows that quantity 40 of asphalt cold-patch compound 2 may be pressed into a smaller volume in response to the compacting. As shown in FIG. 7, following compaction, asphalt cold-patch compound 2 may comprise ground particulate bituminous material 4 and oil binder 6, oil binder 6 and/or portions of compound 2 having flowed into the voids illustrated in FIG. 5 between pieces of ground particulate bituminous material 4, in response to the compacting. In further embodiments, following compaction, asphalt cold-patch compound 2 may comprise ground particulate bituminous material 4 and an oil binder 6, oil binder 6 having been at least partially absorbed into ground particulate bituminous material 4, in response to the compacting, so that the pieces of ground bituminous material 4 are at least partially mixed and/or together. Moreover, the voids illustrated in FIG. 5 between pieces of ground particulate bituminous material 4 may also be distorted and/or filled. In still further embodiments, any mechanism or combination of mechanisms by which the pieces of ground bituminous material 4 may be bound together is contemplated. In this manner, asphalt cold-patch compound 2 may be loose during transportation and application (e.g., with a consistency of wet sand), and yet may congeal, harden, or otherwise form a substantially unitary pliable material following application to surface 20 being patched, such as in response to compacting.

In various embodiments, compacting may comprise the application of an applied pressure to the asphalt cold-patch compound 2 after asphalt cold-patch compound 2 is applied to defect 30 of surface 20. In accordance with various aspects of these embodiments, the applied pressure may comprise about 50 PSI (about 345 kPa) to about 150 PSI (about 1034 kPa). In further embodiments, the applied pressure may comprise about 70 PSI (about 483 kPa) to about 130 PSI (about 896 kPa). Alternately, the applied pressure may comprise about 25 PSI (about 172 kPa) to about 200 PSI (about 1379 kPa). In further embodiments, the applied pressure may comprise about 90 PSI (about 621 kPa). The applied pressure may comprise any suitable pressure that achieves the desired properties of the compacted cold-patch material.

Moreover, the applied pressure may comprise normal operational loads upon surface 20. For example, with respect to surfaces comprising roadways, the applied pressure may comprise the normal operating load applied by passing vehicles. Thus, the roadway may be immediately returned to service after the application of quantity 40 of asphalt cold-patch compound 2 to defect 30 of surface 20 (see FIG. 8, Step 810). In further embodiments, the applied pressure may comprise a pressure applied by a rubber-surfaced roller. For example, a rubber-surfaced roller may be pressed against asphalt cold-patch compound 2 and rolled across it to apply the applied pressure. The rubber-surfaced roller can include, for example, a vehicle tire or other suitable rubber-coated apparatus.

Making a Compound

Figure 9:
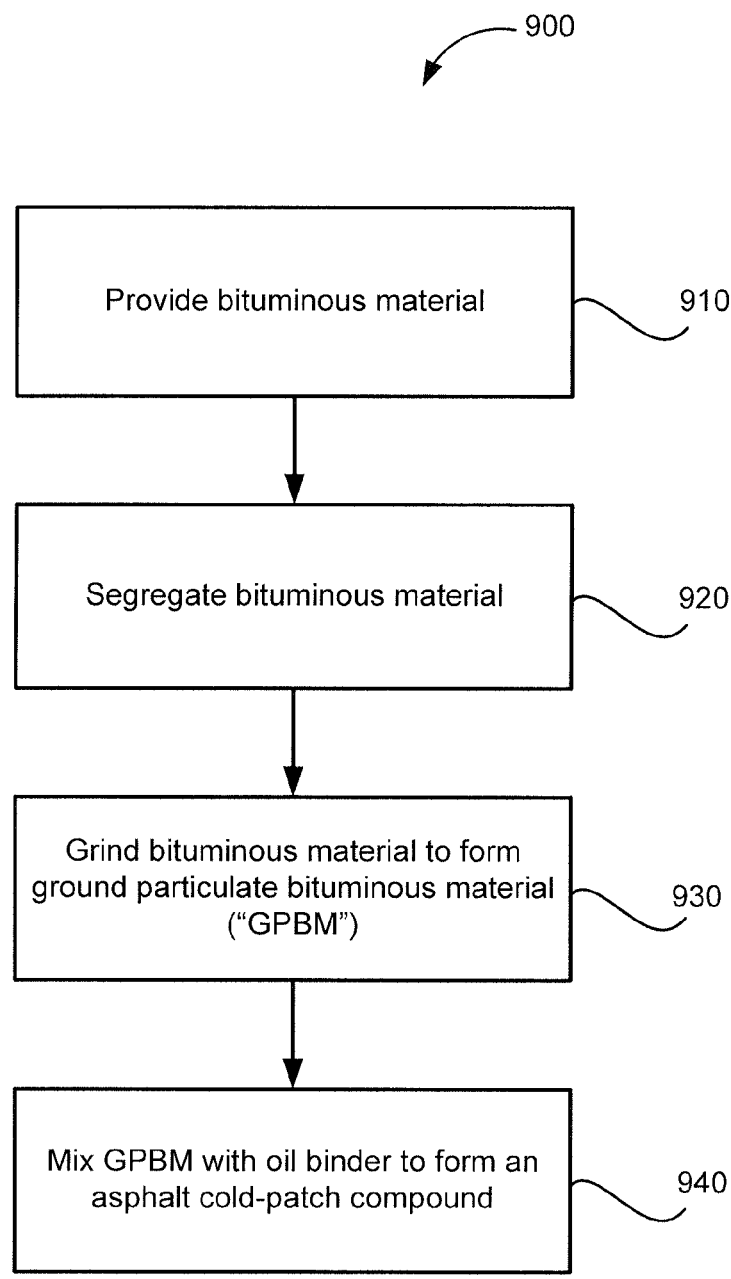
FIG. 9 is a flowchart illustrating an exemplary method of making an asphalt cold-patch compound according to various embodiments.

Having discussed various aspects of an asphalt cold-patch compound 2, attention is directed to FIGS. 1-7 and with initial reference to FIG. 9, which illustrates an exemplary method 900 of making an asphalt cold-patch compound 2.

Exemplary method 900 includes providing bituminous material (Step 910), segregating bituminous material from other waste (Step 920), grinding bituminous material to form ground particulate bituminous material 4 ("GPBM") (Step 930), and mixing GPBM 4 with an oil binder 6 to form an asphalt cold-patch compound 2 (Step 940).

Step 910 of providing bituminous material may include providing bituminous material that is mixed with other waste, such as roofing waste, or construction waste, or any type of waste. Bituminous material may be provided mixed into a waste stream including asphalt shingles and other waste. Alternatively, bituminous material may be provided mixed into a waste stream including only asphalt shingles. Bituminous material may be provided in the form of recycled asphalt shingles. In further embodiments, bituminous material is provided in the form of other recycled asphalt products. Thus, bituminous material may be provided in various forms.

Bituminous material may be segregated from the other waste (Step 920). For instance, magnets may be used to remove ferromagnetic waste, such as roofing nails. Bituminous material may also be segregated from undesired parts of the recycled asphalt roofing shingles, such as fiberglass, felt and/or plastic component, e.g., films and/or shingle backer material. Thus, bituminous material may be segregated from a variety of other waste products, both comprising undesired components of the recycled asphalt roofing shingles themselves, and comprising other waste, through a variety of mechanisms.

Subsequently, bituminous material may proceed to the step 930 of grinding the bituminous material to form ground particulate bituminous material 4 ("GPBM"). This grinding may break the bituminous material into pieces, as described herein. In various embodiments, bituminous material is ground—e.g., using an impact or tub grinder. The grinding may comprise breaking of the bituminous material into pieces by one or more of blades, knives, and/or agitators. The ground material can then be pushed through a grinder screen—e.g., having dimensions up to about 0.25 inch, 0.375 inch, 0.5 inch, or 0.75 inch. The ground material can then be passed through one or more (e.g., vibrating) screens or meshes. By way of examples, bituminous material is ground and then passed through a shaker table (e.g., having a ½" screen), and subsequently passed through one or more meshes and/or vibrating meshes. For instance, ground particulate bituminous material 4 may be passed through a mesh so that the ground particulate bituminous material 4 breaks into smaller pieces, the pieces having a variety of cross-sectional dimensions. Subsequently, ground particulate bituminous material 4 may be further segregated by passing the material through one or more meshes or screens. For instance, ground particulate bituminous material 4 may be passed through a mesh so that ground particulate bituminous material 4 breaks into smaller pieces and/or the smaller pieces are segregated from the larger pieces. The mesh/screen sizes may be those noted above, namely ½", ⅜", no. 4 mesh, and no. 8 mesh, with the percent of material passing through each mesh as noted above.

Finally, GPBM 4 may be mixed with an oil binder 6 to form an asphalt cold-patch compound 2 (Step 940). In various embodiments, GPBM 4 and oil binder 6 are mixed in a mixer (e.g., a cement mixer), although in further embodiments, any mixer, e.g., a rotating drum, may be used. GPBM 4 may be coated with oil binder 6, such as by spray nozzles, and/or may be tumbled with oil binder 6 in a mixer, bin, or the like. By way of example, the oil binder is introduced in measured amounts (e.g., using the ratios noted above) in a vessel or float-activated automatic measuring device with a valve and then poured directly into a mixer with the ground material inside. The ground material and oil are then mixed to form compound 2.

Various testing, including size distribution of particles, asbestos, metals, deleterious products, and similar testing, can be performed at various stages and undesired materials can be removed and/or materials discarded. Further, the compounds described herein may suitably comply with department of transportation requirements, such as Texas DOT standards.

Making & Packaging a Compound

Figure 10:
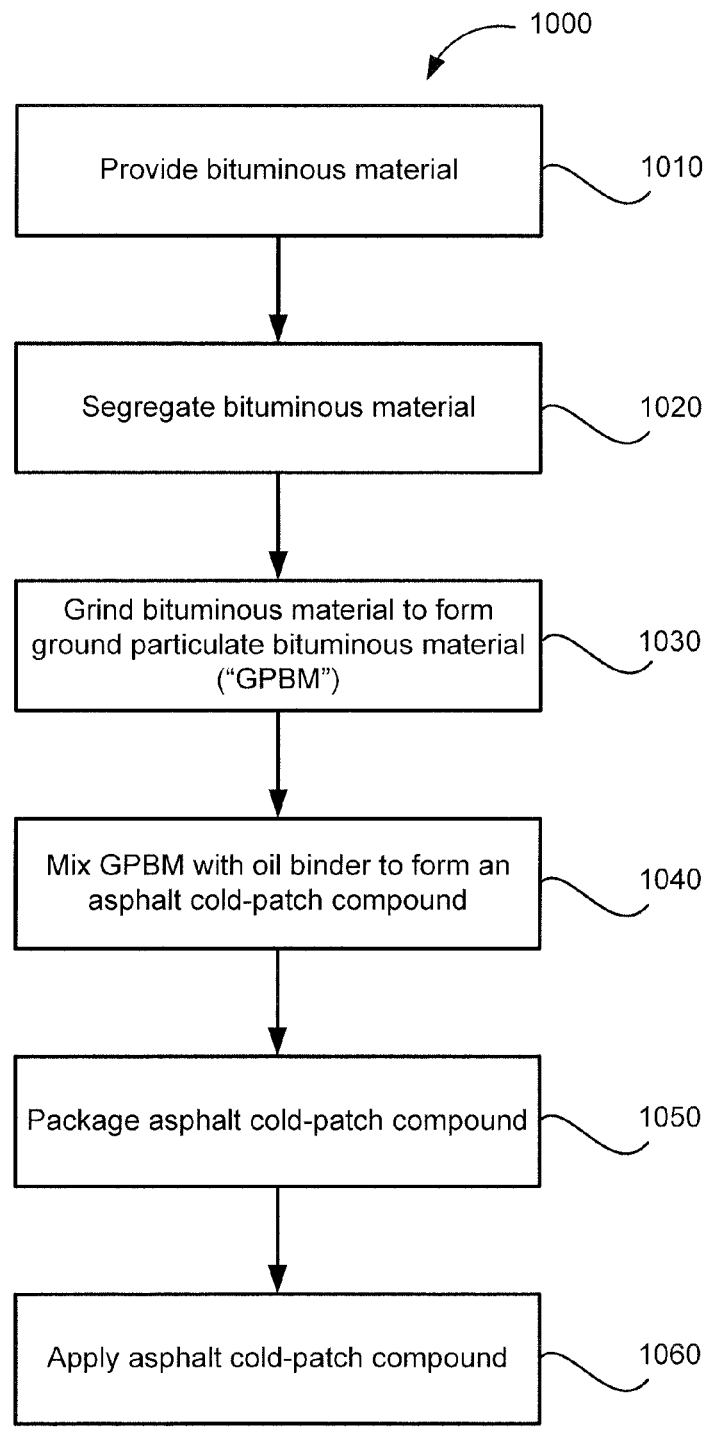
FIG. 10 is a flowchart illustrating an exemplary method of making and packaging an asphalt cold-patch compound according to various embodiments.

Having discussed various methods of making an asphalt cold-patch compound 2, attention is now directed to FIGS. 1-7 and with particular reference to FIG. 10, which illustrates an exemplary method 1000 of making and packaging an asphalt cold-patch compound 2.

Method 1000 includes providing bituminous material (Step 1010), segregating bituminous material from other waste (Step 1020), grinding bituminous material to form ground particulate bituminous material 4 ("GPBM") (Step 1030), and mixing GPBM 4 with an oil binder 6 to form an asphalt cold-patch compound 2 (Step 1040). Method 1000 may include further steps. For example, method 1000 may include packaging asphalt cold-patch compound 2 (Step 1050) and subsequently applying asphalt cold-patch compound 2 to a surface 20 (Step 1060).

Step 1010 of providing bituminous material may include providing bituminous material that is mixed with other waste, such as roofing waste, or construction waste, or any type of waste. Bituminous material may be provided mixed into a waste stream including asphalt shingles and other waste. Alternatively, bituminous material may be provided mixed into a waste stream including only asphalt shingles. Bituminous material may be provided in the form of asphalt shingles and/or other recycled asphalt products.

Bituminous material may be segregated from the other waste (Step 1020). The separating can take place before grinding the material, after grinding the material and before and/or after any of the screening steps described herein. For instance, magnets may be used to remove ferromagnetic waste, such as roofing nails. Bituminous material may also be segregated from undesired parts of the recycled asphalt roofing shingles, such as fiberglass, felt and/or plastic components; for example, films and/or shingle backer material.

Thus, bituminous material may be segregated from a variety of other waste products, both comprising undesired components of the recycled asphalt roofing shingles themselves, and comprising other waste, through a variety of mechanisms.

Subsequently, bituminous material may proceed to the step 1030 of grinding bituminous material to form ground particulate bituminous material 4 ("GPBM"). This grinding may break the bituminous material into pieces, as discussed above. In various embodiments, bituminous material is further segregated via passage of the ground material through one or more vibrating or stationary meshes or screens as described above. In further embodiments, ground bituminous passed through a shaker table, and subsequently passed through one or more meshes and/or vibrating meshes.

GPBM 4 (which may be passed through various meshes/screens as noted herein) may be mixed with an oil binder 6 to form an asphalt cold-patch compound 2 (Step 1040). In various embodiments, GPBM 4 and petroleum binder 6 are mixed in mixer, such as a mixer described herein. GPBM 4 may be coated with oil binder 6, such as by spray nozzles, and/or may be tumbled with the oil binder 6 in a mixer, bin, or the like.

Subsequently, asphalt cold-patch compound 2 may be packaged (Step 1050). Asphalt cold-patch compound 2 may be packaged in buckets, such as sealable buckets. The buckets may be, for example, resealable five-gallon buckets. Because asphalt cold-patch compound 2 comprises a loose composition, asphalt cold-patch compound 2 may be packaged in any packaging that permits application, such as by dumping, shoveling, augering, or any other loose application method. For instance, asphalt cold-patch compound 2 may be packaged in sacks, or may be delivered in bulk, such as for application via an auger.

Finally, asphalt cold-patch compound 2 may be applied to a surface 20 (Step 1060) such as discussed above. This application may include various steps or combinations of steps discussed herein. For instance, step 1060 of applying asphalt cold-patch compound 2 to a surface 20 may include at least one of shoveling, augering, and/or dumping quantity 40 of asphalt cold-patch compound 2 into defect 30 of surface 20. The applying may also include exerting an applied pressure onto quantity 40 of asphalt cold-patch compound 2 in defect 30 of surface 20. This pressure may bind asphalt cold-patch compound 2 into a substantially unitary pliable material. In further embodiments, surface 20 is immediately returned to service and the pressure exerted under normal operations, such as by passing vehicles driving upon surface 20, to bind asphalt cold-patch compound 2 into a substantially unitary pliable material.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure and may be expressed in the following claims.

The present disclosure has been described with reference to various embodiments. However, one appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "proximate," "proximately," or any other variation thereof, are intended to cover a physical connection, an electrical connection, a magnetic connection, an optical connection, a communicative connection, a functional connection, and/or any other connection. When language similar to "at least one of A, B, or C" is used, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C. Furthermore, the compounds and methods described herein can comprise, consist essentially of, or consist of the various ingredients and steps.

We claim:

1. A compound for cold-patch applications, the compound consisting of:
    a bituminous material, wherein the bituminous material consists of recycled asphalt roofing shingles ground into a ground particulate bituminous material and up to 1.5% of material selected from the group consisting of fiberglass, felt, film, shingle backer material, and combinations thereof, wherein one hundred percent of the bituminous material passes through a 0.25 inch screen; and
    a binder consisting of oil or oil containing metal particles, wherein a weight ratio of the ground particulate bituminous material to the binder is between about 9:1 to about 20:1,
    wherein the compound is a loose composition of ground particulate bituminous material coated with oil after packaging, during transportation, and during application, and
    wherein the compound forms a single piece following application of the compound to a surface.

2. The compound for cold-patch applications according to claim 1, wherein each of the particles of the ground particulate bituminous material have a cross-sectional dimension of about 0.187 inch or less.

3. The compound for cold-patch applications according to claim 1, wherein, at least 85% of the ground particulate bituminous material has a cross-sectional dimension of about 0.187 inch or less.

4. The compound for cold-patch applications according to claim 1, wherein the oil binder consists of used motor oil.

5. A compound for cold-patch applications, the compound consisting of:
    a bituminous material consisting of recycled asphalt roofing shingles ground into a ground particulate bituminous material, wherein one hundred percent of the bituminous material passes through a 0.25 inch screen; and
    a binder consisting of oil or oil containing metal particles, wherein a weight ratio of the ground particulate bituminous material to the binder is between about 9:1 to about 20:1, wherein the mixture is a loose composition of ground particulate bituminous material coated with oil after mixing, during transportation, and during application, and wherein the mixture forms a single piece following application of the mixture to a surface.

6. The compound for cold-patch applications according to claim 5, wherein each of the particles of the ground particulate bituminous material have a cross-sectional dimension of about 0.187 inch or less.

7. The compound for cold-patch applications according to claim 5, wherein at least 85% of the ground particulate bituminous material has a cross-sectional dimension of about 0.187 inch or less.

8. The compound for cold-patch applications according to claim 5, wherein the oil binder consists of used motor oil.

* * * * *